April 17, 1951 A. ALLISON 2,549,559
PHARMACEUTICAL MEANS FOR FACILITATING THE
MAKING OF SUPPOSITORIES OR THE LIKE
Filed Dec. 5, 1947
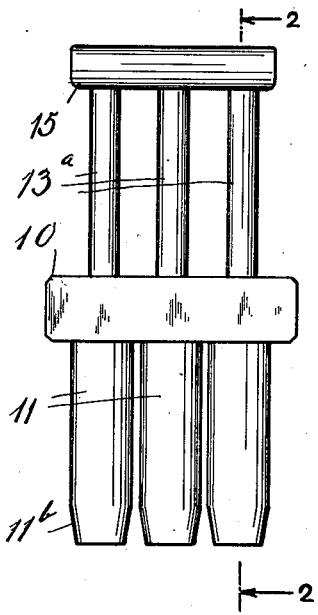
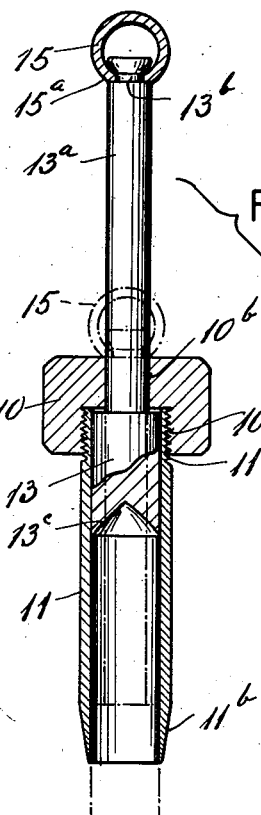
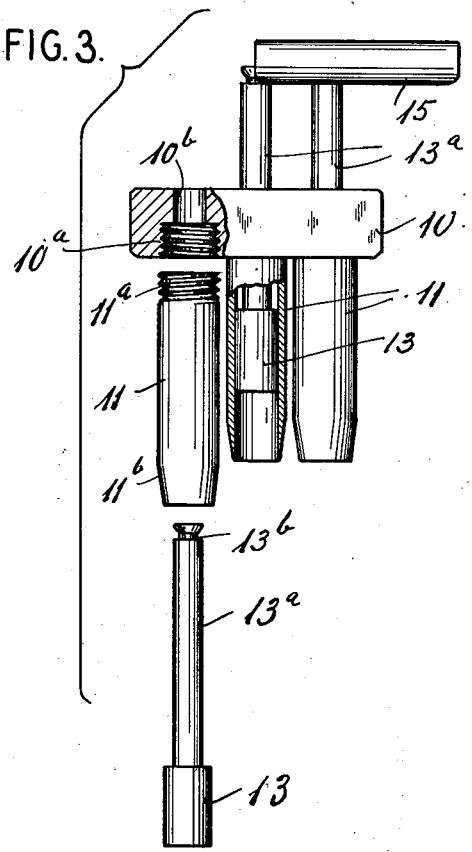
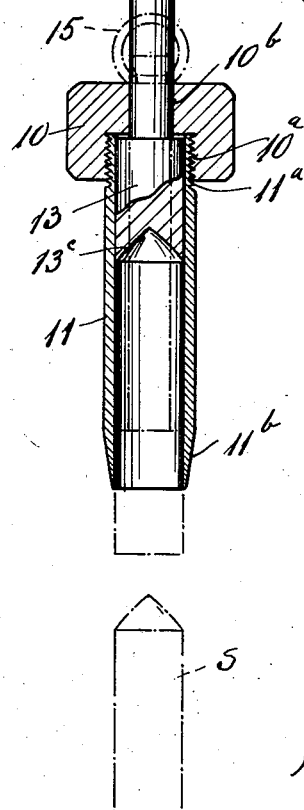
INVENTOR.
Abraham Allison
By
Mark Ordmann
ATTORNEY.

Patented Apr. 17, 1951

2,549,559

UNITED STATES PATENT OFFICE 2,549,559

PHARMACEUTICAL MEANS FOR FACILITATING THE MAKING OF SUPPOSITORIES OR THE LIKE

Abraham Allison, New York, N. Y.

Application December 5, 1947, Serial No. 789,834

1 Claim. (Cl. 18—5)

This invention relates to pharmaceutical means for producing mechanically such articles as suppositories, lipsticks or the like, and has for its object to provide a device whereby the work of making such articles will be considerably facilitated and expedited, and render the handling of the article more sanitary than by the method hitherto used.

My novel device substantially comprises a plurality of cylindrical or tubular molds projecting from a single holder and a corresponding number of plungers working therein and also interconnected by and projecting from a second holder. The dough-like mass previously prepared from the ingredients of the required mixture is pressed into said molds and subsequently ejected from them by said plungers.

My invention will be more fully understood by reference to the accompanying drawing which constitutes part of this specification and in which similar numerals denote corresponding parts.

Fig. 1 is an elevation of the device showing the plungers in retracted position;

Fig. 2 is an enlarged vertical section on line 2—2 of Fig. 1, and

Fig. 3 is a sectional elevation of the device in partly disassembled condition.

Referring more in detail to the drawing, 10 denotes a holder in form of a block of suitable rigid material from which project vertically, relative to the position of use, a number of parallel contiguously mounted cylindrical or tubular molds 11. The upper ends of these tubular molds preferably may be detachably secured in said holder, so that they may be removed from time to time for cleaning purposes. In the example shown, these ends are screw threaded as at 11$^a$, adapted to screw into cylindrical sockets 10$^a$ provided in said holder 10. The lower ends of the molds are externally tapered as at 11$^b$.

Adapted to snugly but slidably fit in said molds are plungers 13 whose stems 13$^a$ project outwardly through bores 10$^b$ extending centrally from the sockets 10$^a$ to the upper face of the holder 10. The outer ends of said stems 13$^a$ are each provided with an annular groove 13$^b$ adapted to be slidably and frictionally engaged by the opposite edges 15$^a$ of a tubular longitudinally split member 15. The inner ends of the plungers 13 are provided with conical or inwardly tapered cavities 13$^c$.

The device is used in the following manner:

I first prepare a dough-like mass from the ingredients necessary for the particular article, on a flat surface, and form it to a heap of substantially uniform height, somewhat larger than the depth of a mold, and in length and width about equal to the length and width of the area occupied by the molds. Thereupon, on moistening the interior of the molds and the surfaces of the plungers with a suitable substance and on gripping the holder 10 with one hand and the retracted holder 13 with the other hand, I press the device vertically down through the heap so that the molds become fully packed with the mass. Thereupon, on lifting the device from the mass, and depressing the plungers, I eject the formed article S from the molds.

For suppositories, I mix the ingredients with grated cocoa butter and moisten the interior of the molds and the plunger surfaces with a tincture of green soap or I dust them with powdered starch.

By using the above described device, I eliminate kneading and thereby render the product more sanitary, considerably reduce labor, time and cost.

The detachable mounting of the molds and that of the plungers in their respective holders facilitates cleaning of the parts.

My invention is not restricted to the number of molds, nor to the particular details of construction, since various changes may be made without departure from the principle of my invention.

What I claim is:

A portable sanitary compressor for producing suppositories or like articles comprising a holder having a plurality of sockets, a like number of cylindrical tubular molds each open at its bottom and each removably suspended from one of the sockets in said holder, the lower end of each of said molds being tapered externally, a corresponding number of longitudinally movable plungers one within each said mold, each plunger having a stem at one end projecting outwardly of the socket and mold in which it is movable, and each stem having an annular groove, the other end of each stem being secured to one of said plungers, the other end of each said plunger having a cavity, and a split member slidably and frictionally engaging each said stem about its groove, said compressor being adapted to be manually pressed through a heap of previously prepared mixture of ingredients used for a particular article to cause said mixture to be compressed simultaneously into each said tubular mold and thereafter to be manually expressed from all the molds by the said plungers.

ABRAHAM ALLISON.

REFERENCES CITED

The following references are of record in the file of this patent:

UNITED STATES PATENTS

| Number | Name | Date |
|---|---|---|
| 126,641 | Mabbitt, Jr. | May 14, 1872 |
| 851,284 | Flinn | Apr. 23, 1907 |
| 1,321,829 | Kipniss et al. | Nov. 18, 1919 |
| 1,438,315 | Knowlton | Dec. 12, 1922 |
| 1,558,751 | Nueske, Jr. | Oct. 27, 1925 |
| 2,183,928 | Binder | Dec. 19, 1939 |